US006445538B1

(12) United States Patent
McKinstry et al.

(10) Patent No.: US 6,445,538 B1
(45) Date of Patent: Sep. 3, 2002

(54) ELECTROSTATIC DISCHARGE CONTROL IN TAPE READING HEADS WITH CONDUCTIVE EPOXY ADHESIVE

(75) Inventors: Kevin Dale McKinstry, Laporte; Steven Castle Sanders, Louisville; Joseph Edward Torline, Arvada, all of CO (US)

(73) Assignee: Storage Technology Corporation, Louisville, CO (US)

( * ) Notice: Subject to any disclaimer, the term of this patent is extended or adjusted under 35 U.S.C. 154(b) by 13 days.

(21) Appl. No.: 09/685,954

(22) Filed: Oct. 12, 2000

(51) Int. Cl.[7] ................................................ G11B 5/29
(52) U.S. Cl. ...................................................... 360/128
(58) Field of Search .................................. 360/128, 323

(56) References Cited

U.S. PATENT DOCUMENTS

| | | | |
|---|---|---|---|
| 4,972,286 A | * 11/1990 | Jurisch et al. | ............... 360/110 |
| 4,985,797 A | * 1/1991 | Yohda et al. | ................ 360/125 |
| 5,161,299 A | * 11/1992 | Denison et al. | .......... 29/603.13 |
| 5,539,598 A | * 7/1996 | Denison et al. | ............. 360/121 |

\* cited by examiner

*Primary Examiner*—William Klimowicz
(74) *Attorney, Agent, or Firm*—Carstens, Yee & Cahoon, L.L.P.

(57) ABSTRACT

An apparatus and method for controlling electrostatic discharge in magnetic tape heads is, provided. This method includes using a conductive adhesive to electrically connect the substrate and closure of each read/write module as well as connect the read/write modules in the head. The conductive adhesive can be used as an adjunct or a replacement for adhesives used during the normal assembly process. The modules are then connected to ground. In one embodiment, the read modules are electrically tied to the write module, which is then connected to ground through a high resistance path.

16 Claims, 2 Drawing Sheets

ELECTROSTATIC DISCHARGE CONTROL IN TAPE READING HEADS WITH CONDUCTIVE EPOXY ADHESIVE

BACKGROUND OF THE INVENTION

1. Technical Field

The present invention relates to magnetic tape heads. More specifically, the present invention relates to controlling electrostatic discharge during tape head operation.

2. Description of Related Art

Electrostatic discharge events in tape recording heads occur typically with mishandling or in operation, when magnetic tape passes over the head. In both cases, a static charge is accumulated and then discharged through the read elements, which can result in serious damage to or destruction of the read elements.

Modern tape heads are particularly vulnerable to electrostatic discharge. As tape head designs move from insulating ferrite materials to conductive ceramic materials in the substrate and closure, the incidence of electrostatic buildup, and subsequent discharge, becomes greater. As the read elements on magnetic tape heads become smaller and more delicate, the effects of electrostatic discharge become more destructive. In addition, thin film shields used in the reader design offer less protection to the readers from electrostatic discharge.

In conventional tape head designs, each of the major components can be electrically isolated from the rest of the head, which will allow a static charge to accumulate. When the charge is high enough, it will discharge through the nearest available ground, typically the nearest read element. Therefore, a tape head design that controls electrostatic discharge, by allowing accumulated electrostatic charge to drain safely to ground without damaging the read elements, would be desirable.

SUMMARY OF THE INVENTION

The present invention provides an apparatus and method for controlling electrostatic discharge in magnetic tape heads. This method includes using a conductive adhesive to electrically connect the substrate and closure of each read/write module as well as connect the read/write modules in the head. The conductive adhesive can be used as an adjunct to or a replacement for adhesives used during the normal assembly process. The modules are then connected to ground. In one embodiment, the read modules are tied to the write module, which is then connected to ground through a high resistance path.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
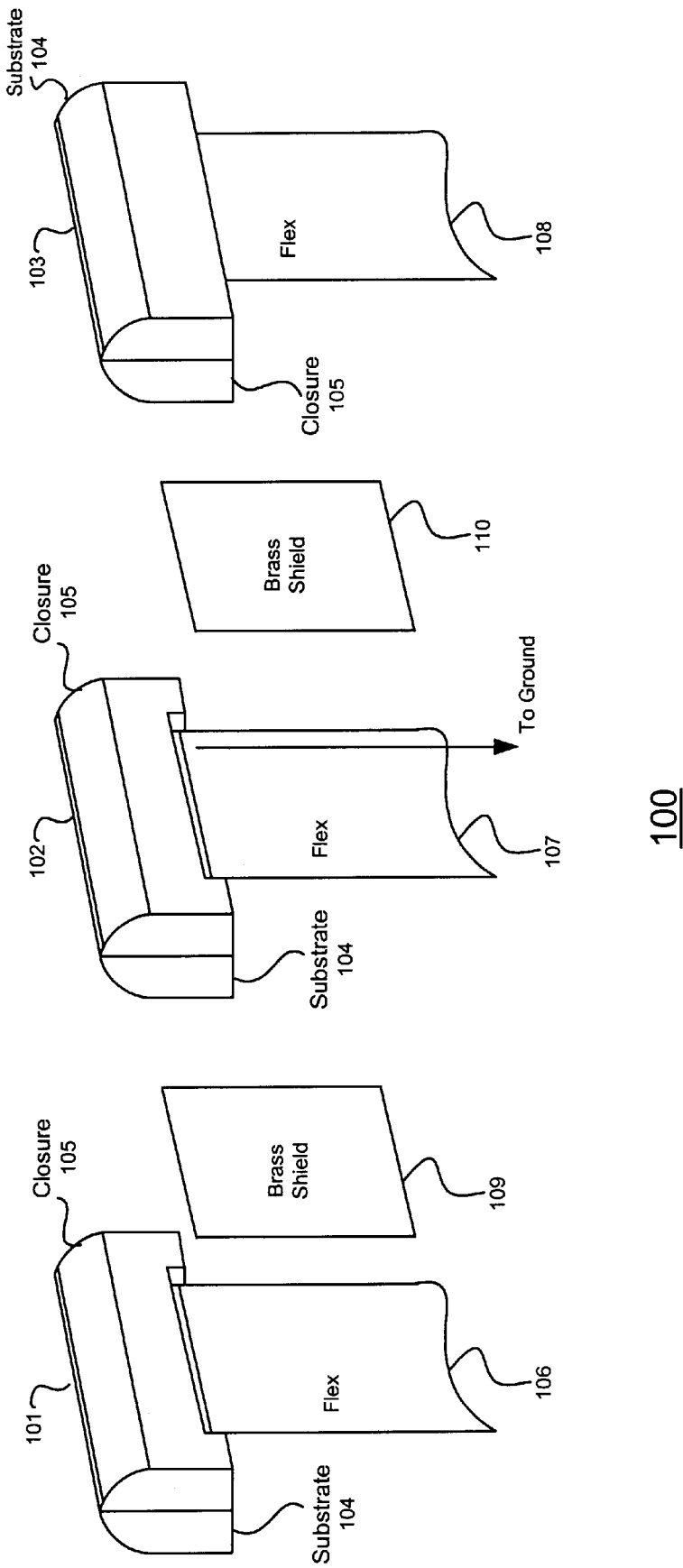
FIG. 1 depicts an exploded perspective view schematic diagram illustrating the individual components of the tape head to be grounded in accordance with the present invention.

Referring to FIG. 1, an exploded perspective view schematic diagram illustrating the individual components of the tape head to be grounded is depicted in accordance with the present invention. The example depicted in FIG. 1 is a three-module read/write/read head 100. However, it must be understood that the present invention applies to other head configurations as well.

The two read modules 101 and 103, and the write module 102, are each composed of a substrate 104 and a closure 105. In modern tape heads, the only mechanical function of the closure 105 is for the installation of transverse slots, which are used to eliminate air bearings under tape and maintain proper contact between the tape and head. The substrate 104 contains the active read/write elements. The read elements are essentially thin film layers on top of the substrate 104. In conventional tape head designs, the substrate 104 and closure 105 are held together with an insulating glue, which is chosen for mechanical integrity under various conditions.

Each module 101–103 in the tape head 100, has a ribbon or "flex" cable 106–108 which connects the modules 101–103 with the electronic components of the tape drive (not pictured). The flex cables 106–108 each have copper shields within them to prevent electromagnetic interference. Placed between the individual modules 101–103 are brass shields 109 and 110. The brass shields 109 and 110 provide electrical shielding between the head modules 101–103, which reduces inter-module coupling and module-to-module interference. The brass shields 109 and 110 are connected to the flex cable 107 of the write module 102 further down than is shown in FIG. 1.

Conventional tape head designs have used ferrite materials in constructing the substrates and closures of the head modules. Ferrites materials do not act as electrostatic charge reservoirs that build up and result in electrostatic discharge (ESD), which can damage or destroy read modules. However, new tape head designs, such as tape head 100, use conductive ceramic materials in constructing the substrates 104 and closures 105, such as, for example, aluminum titanium carbide. These newer, conductive ceramic materials are more likely to build up an electrostatic charge, resulting in ESD and damage to the read modules 101 and 103.

The solution to the problem of ESD is to provide a stable electrical path for each module 101–103 in the tape head 100 to safely drain charge to ground. The present invention addresses this problem by use of a conductive adhesive to electrically connect together each of the ceramic components, and then connect the assembly to ground through a high resistance path.

Figure 2:
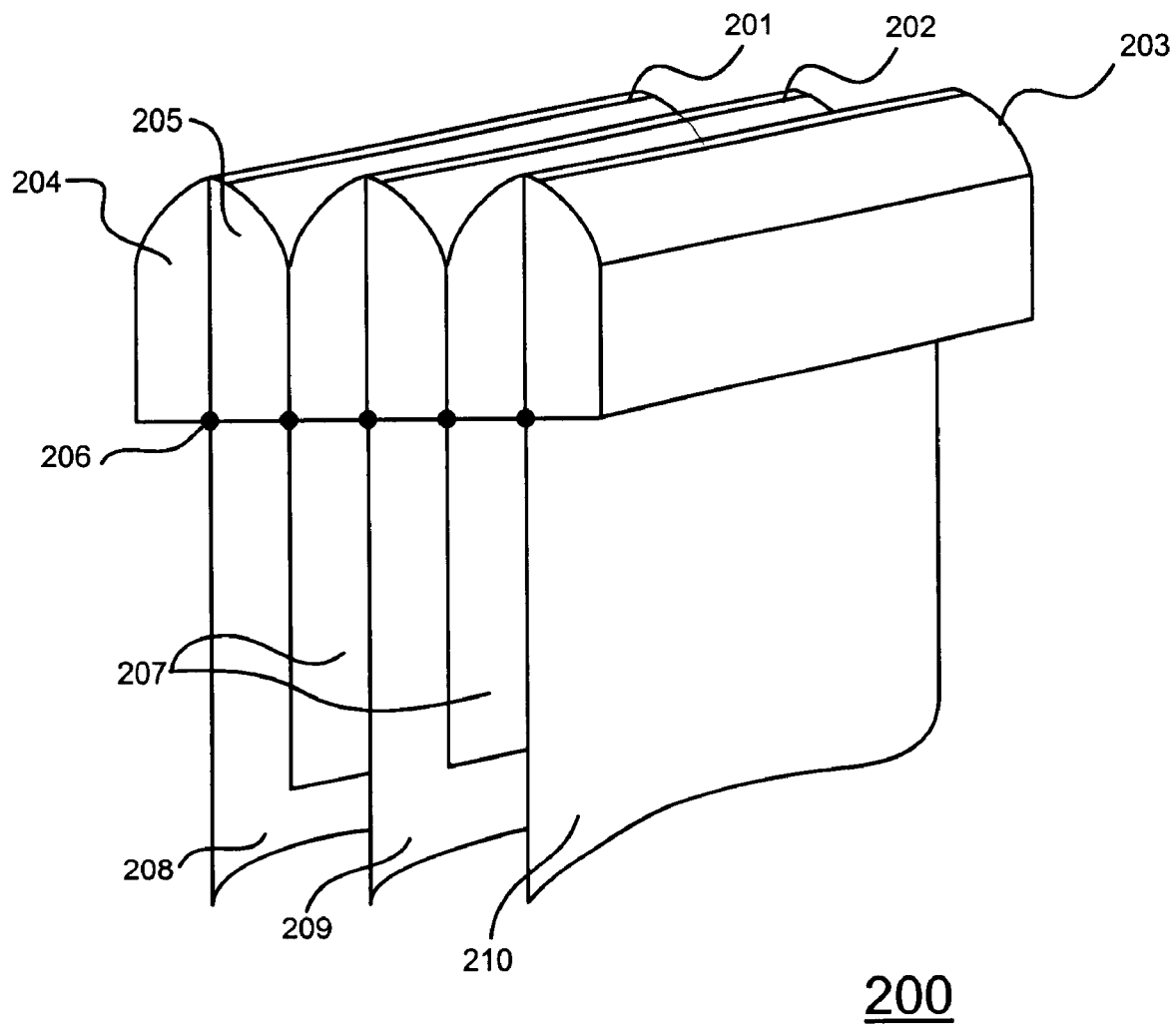
FIG. 2 depicts a perspective view schematic diagram illustrating an assembled tape head incorporating conductive adhesive in accordance with the present invention.

Referring now to FIG. 2, a perspective view schematic diagram illustrating an assembled tape head 200 incorporating conductive adhesive is depicted in accordance with the present invention. The conductive adhesive 206 is depicted by the black filled circles. It should be noted that there are similar positions for the conductive adhesive on the opposite side (not shown) of the tape head 200. This adhesive 206 is used to electrically connect the substrate 204 and closure 205 of each module 201–203 as well as connect the assembled modules 201–203 together. The conductive adhesive is also used to connect the modules 201–203 to the brass shields 207.

A suitable high resistance path to ground can be made by tying the read heads 201 and 203 to the flex cable 209 of the write module 202 and going to ground through the write flex cable 209. This approach is made for the sake of simplicity because it does not require much modification in the flex cables 208–210 or the substrates 204. However, in another embodiment, it is possible to tie a ground line directly to the substrate 204 of each read/write module 201–203 and have three separate paths to ground.

The conducting adhesive 206 is placed on module surfaces away from the tape-bearing surface, and can be used as a replacement for, or as an adjunct to, the adhesive which is used in the normal assembly process to connect the substrate 204 and closure 205, and to connect the individual modules 201–203.

The conductive adhesive used in the present invention can have different levels of conductivity, depending on what elements are added to it. For example, adding silver to an epoxy adhesive creates a high level of conductivity, whereas adding carbon to the epoxy will create a lower level of conductivity. The present invention does not need a highly conductive path. A conductivity value of 50k or lower is suggested for the present invention. However, different conductivity values may be needed as different materials are incorporated into substrate and closure designs.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A magnetic tape head assembly, comprising:
   a plurality of read/write modules, each comprised of a substrate and a closure, wherein the substrate and closure are ceramic and are electrically connected with a conductive adhesive;
   wherein said plurality of read/write modules are electrically connected with said conductive adhesive; and
   a connection of said read/write modules to ground.

2. The tape head assembly according to claim 1, further comprising brass shields electrically connected to the read/write modules with said-conductive adhesive.

3. The tape head assembly according to claim 1, wherein the conductive adhesive is placed on module surfaces away from any tape-bearing surface.

4. The tape head assembly according to claim 1, wherein the conductive adhesive is placed on the edge of each of the read/write modules.

5. The tape head assembly according to claim 1, wherein the conductive adhesive is used to connect the substrate and closure of the read/write modules during the normal assembly process.

6. The tape head assembly according to claim 1, wherein the connection of the read/write modules to ground comprises:
   ties between the read modules and the write module; and
   a high resistance ground line from the write module to ground.

7. The tape head assembly according to claim 1, wherein the connection of the read/write modules to ground comprises high resistance ground lines tied directly to the substrate of each module.

8. The tape head assembly according to claim 1, wherein the conductive adhesive has a conductivity of 50 k or less.

9. A method for controlling electrostatic discharge in magnetic tape heads, comprising:
   electrically connecting a ceramic substrate and closure of a plurality of read/write modules with a conductive adhesive;
   electrically connecting the read/write modules with said conductive adhesive; and
   connecting the read/write modules to ground.

10. The method according to claim 9, further comprising electrically connecting each of the read/write modules to brass shields with said conductive adhesive.

11. The method according to claim 9, wherein the conductive adhesive is placed on module surfaces away from any tape-bearing surface.

12. The method according to claim 9, wherein the conductive adhesive is placed on the edge of each of the read/write modules.

13. The method according to claim 9, wherein the conductive adhesive is used to connect the substrate and closure of the read/write modules during normal assembly process.

14. The method according to claim 9, wherein connecting the read/write modules to ground comprises:
   tying the read modules to the write module; and
   connecting the write module directly to a high resistance path to ground.

15. The method according to claim 9, wherein the step of connecting the read/write modules to ground comprises tying the substrate of each module to a high resistance path to ground.

16. The method according to claim 9, wherein the conductive adhesive has a conductivity of 50 k or less.

* * * * *